United States Patent [19]

Jarzombek

[11] Patent Number: 6,122,830
[45] Date of Patent: Sep. 26, 2000

[54] SELF-POWERED DEVICE FOR WEARING ON THE BACK AND FOR CUTTING FOLIAGE

[76] Inventor: Richard J. Jarzombek, 2143 Osborne Ave., Baiting Hollow, N.Y. 11933

[21] Appl. No.: 09/246,587

[22] Filed: Feb. 8, 1999

[51] Int. Cl.$^7$ .................................................. A01D 34/00
[52] U.S. Cl. .................. 30/276; 30/347; 464/52
[58] Field of Search .................. 30/276, 347, 296.1; 464/52; 56/12.7

[56] References Cited

U.S. PATENT DOCUMENTS

| | | | |
|---|---|---|---|
| 3,219,129 | 11/1965 | Yamada | 30/296.1 X |
| 4,242,855 | 1/1981 | Beaver, Jr. | 56/13.7 |
| 4,483,070 | 11/1984 | Junkermann | 30/296 R |
| 4,575,356 | 3/1986 | Murohushi et al. | 464/52 |
| 4,658,778 | 4/1987 | Gamoh et al. | 123/195 C |
| 4,989,323 | 2/1991 | Casper et al. | 30/296.1 |
| 5,289,605 | 3/1994 | Armbruster | 15/97.1 |
| 5,474,278 | 12/1995 | Cleveland | 254/334 |

*Primary Examiner*—Douglas D. Watts
*Attorney, Agent, or Firm*—Richard L. Miller, P.E.

[57] ABSTRACT

A self-powered device for cutting foliage that includes a backpack portion, a foliage cutting portion, and a coupling portion. The backpack portion includes a frame, a gas engine, and a flexible shaft. The coupling portion includes a power portion and a tool portion. The power portion includes a collar that is crimped on the sheathing of the flexible shaft of the backpack portion and a stop that extends fixedly and axially from the collar of the power portion. The tool portion includes a collar that is crimped on the casing of the flexible drive shaft of the foliage cutting portion with the end thereof having a blind bore extending axially therethrough which fixedly receives the end of the flexible shaft of the backpack portion. The collar of the tool portion has an inner periphery that fixedly receives the stop of the power portion. The collar of the tool portion further has a split that is defined by a pair of flanges that threadably engage a key that passes therethrough, and when tightened, secures the end of the flexible shaft of the backpack portion in the blind bore in the flexible drive shaft of the foliage cutting portion, and secures the stop of the power portion in the inner periphery of the collar of the tool portion.

1 Claim, 1 Drawing Sheet

SELF-POWERED DEVICE FOR WEARING ON THE BACK AND FOR CUTTING FOLIAGE

BACKGROUND OF THE INVENTION

1. Field of the Invention

The present invention relates to a self-powered device for wearing on the back. More particularly, the present invention relates to a self-powered device for wearing on the back and for cutting foliage.

2. Description of the Prior Art

Numerous innovations for backpack devices have been provided in the prior art that will be described. Even though these innovations may be suitable for the specific individual purposes to which they address, however, they differ from the present invention.

A FIRST EXAMPLE, U.S. Pat. No. 4,242,855 to Beaver, Jr. teaches an edge trimmer mounted as auxiliary equipment on a rotary lawn mower. A flexible drive shaft has a first end connected to the top end of the lawn mower engine crankshaft. The opposite end of the flexible shaft is connected to a rotatable input driver of a trimmer. A rotatable cutting head on the trimmer is connectable to the flexible drive shaft by the rotatable input driver. The trimmer is mounted on the lawn mower and may be removed therefrom while connected to the engine crankshaft to facilitate trimming of grass at a location away from the lawn mower. A compressor and reservoir tank is mounted to the lawn mower and may be powered by the flexible drive shaft for spraying insecticide or other liquid.

A SECOND EXAMPLE, U.S. Pat. No. 4,483,070 to Junkermann teaches a portable cutter particularly useful in trimming and shaping standing growing trees of the evergreen type which has a cutting head mounted on one end of a rod, and a pistol grip type control handle on the other end. A second handle is secured on the rod substantially midway between the control handle and cutting head. A back pack having partial waist encircling support means with a belt and a securing buckle is provided with a pair of spaced apart vertical standards secured to said encircling support having a transverse connector therebetween above said waist support. The back pack is retained on the operator by a pair of shoulder strap connector means attached to each end of center of said transverse connector and connectable to said waist support. Back pack extension and guide means is carried by and secured to at least one of the vertical standards. A cutter suspension shock cord is adapted to be connected between the back pack extension and the cutter rod proximate the cutting head and being adjustable along the rod to permit adjustability for varying the apparent weight of the cutter from an apparent zero to an amount desired by the operator to provide maximum maneuverability with a minimum of operator fatigue. The prime mover is carried by the back pack above the waist encircling support and supplied power to a motor connected to drive the cutting head and being carried thereby. There is a selectively operable control connected between the prime mover and motor for selectively driving the motor under control of the pistol grip control handle.

A THIRD EXAMPLE, U.S. Pat. No. 4,658,778 to Gamoh et al. teaches a piggyback type blower unit. The blower unit comprises a piggyback frame, a fan case incorporating a fan, a powder tank arranged on top of the fan case, a fuel tank arranged behind said fan case, and an engine fixed behind the fan case and on top of the fuel tank. The piggyback frame comprises hollow frame members and is connected to the suction side of the engine to form a suction path for sucking and supplying air for the engine through the suction path, or connected to the suction side of the fan to form a suction path for sucking and supplying air for the fan through the suction path. An air cleaner is inserted within the hollow piggyback frame on the suction path communicating with the suction side of the engine.

A FOURTH EXAMPLE, U.S. Pat. No. 4,989,323 to Casper et al. teaches a portable power unit for use with various power tools.

A FIFTH EXAMPLE, U.S. Pat. No. 5,289,605 to Armbruster teaches a cleaning apparatus in the form of a scrubber that is motor driven by a direct current (DC) motor driving a rotatable scrubber unit which includes a scrubber disc with the motor and scrubber disc forming a power head supported from a detachable and adjustable length pole which enables surfaces that are normally out of reach to be easily scrubbed. The scrubber disc incorporates a unique pad structure driven through a unique clutch structure with the power head being supported from the pole and connected with a source of DC electric power through a unique, dependable and long lasting electrical conductor arrangement. Interchangeable scrubber discs are utilized and the scrubber may be powered by a 12 volt DC motor connected to a portable 12 volt battery which may be supported as a backpack or the like, a 12 volt AC/DC transformer, plugged directly into a cigarette lighter on a vehicle or a vehicle battery or to any other source of 12 volt DC electrical power to supply the motor with electrical power to enable the motor to rotate the scrubber disc with adequate torque for scrubbing various surfaces.

A SIXTH EXAMPLE, U.S. Pat. No. 5,474,278 to Cleveland teaches a compact, light weight, back packable winch and power source, including a cable quick release device to facilitate single handed use of the winch. The power train and cable retrieval mechanisms are mounted on one side of a back pack frame or platform, and straps and padding enabling the mechanism to be carried like a back pack are mounted on the other side of the frame together with folding legs that assist in supporting the assembly during operation. A substantial quantity of small diameter cable is wound onto the winch spool by a level wind mechanism. The spool and level wind mechanism are powered, through chain and sprocket assemblies, by a hydraulic motor. The hydraulic motor is powered by a compact gasoline engine that operates a hydraulic pump to supply hydraulic fluid to the hydraulic motor, controlled by a flow control valve. The quick release utilizes pincers attached to the cable end and a shroud that holds the pincers closed around a chain link or loop and that may be slipped out of engagement with the pincers to permit them to open and release the load attached to the chain link or loop.

It is apparent that numerous innovations for backpack devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a self-powered device for wearing on the back and for cutting foliage that avoids the disadvantages of the prior art.

ANOTHER OBJECT of the present invention is to provide a self-powered device for wearing on the back and for cutting foliage that is simple and inexpensive to manufacture.

STILL ANOTHER OBJECT of the present invention is to provide a self-powered device for wearing on the back and for cutting foliage that is simple to use.

BRIEFLY STATED, YET ANOTHER OBJECT of the present invention is to provide a self-powered device for cutting foliage that includes a backpack portion, a foliage cutting portion, and a coupling portion. The backpack portion includes a frame, a gas engine, and a flexible shaft. The coupling portion includes a power portion and a tool portion. The power portion includes a collar that is crimped on the sheathing of the flexible shaft of the backpack portion and a stop that extends fixedly and axially from the collar of the power portion. The tool portion includes a collar that is crimped on the casing of the flexible drive shaft of the foliage cutting portion with the end thereof having a blind bore extending axially therethrough which fixedly receives the end of the flexible shaft of the backpack portion. The collar of the tool portion has an inner periphery that fixedly receives the stop of the power portion. The collar of the tool portion further has a split that is defined by a pair of flanges that threadably engage a key that passes therethrough, and when tightened, secures the end of the flexible shaft of the backpack portion in the blind bore in the flexible drive shaft of the foliage cutting portion, and secures the stop of the power portion in the inner periphery of the collar of the tool portion.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

Figure 1:
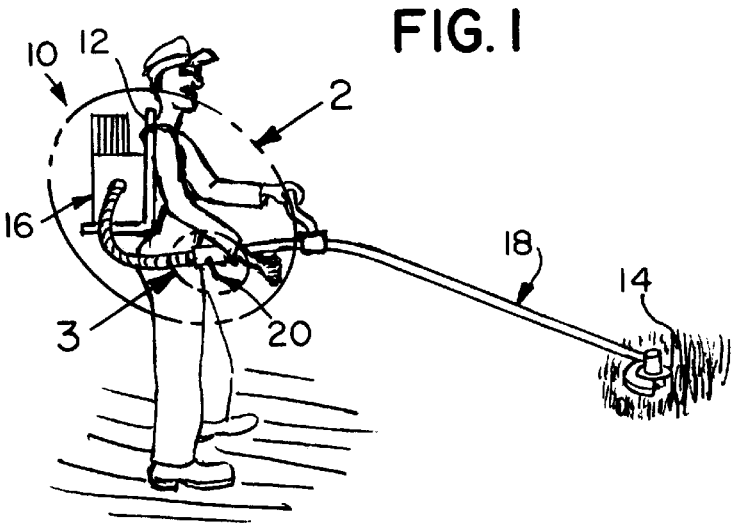
FIG. 1 is a diagrammatic perspective view of the present invention in use.

LIST OF REFERENCE NUMERALS UTILIZED IN THE DRAWING 10 self-powered device for wearing on the back and for cutting foliage of the present invention
12 back
14 foliage
16 backpack portion for wearing on back 12
18 foliage cutting portion for cutting foliage 14
20 coupling portion
22 frame of backpack portion 16 for engaging back 12
24 gas engine of backpack portion 16
26 flexible shaft of backpack portion 16
28 sheathing covering flexible shaft 26 of backpack portion 16
28a flexible drive shaft of foliage cutting portion 18
29 end of flexible shaft 26 of backpack portion 16
30 end of flexible drive shaft 28a of foliage cutting portion 18
31 casing of flexible drive shaft 28a of foliage cutting portion 18
34 power portion of coupling portion 20
36 tool portion of coupling portion 20
38 collar of power portion 34 of coupling portion 20
40 stop of power portion 34 of coupling portion 20
42 collar of tool portion 36 of coupling portion 20
44 blind bore in end 30 of flexible drive shaft 28a of foliage cutting portion 18
46 outer periphery of collar 42 of tool portion 36 of coupling portion 20
48 inner periphery of collar 42 of tool portion 36 of coupling portion 20
50 split in collar 42 of tool portion 36 of coupling portion 20
52 pair of flanges defining split 50 in collar 42 of tool portion 36 of coupling portion 20
54 key of collar 42 of tool portion 36 of coupling portion 20

DETAILED DESCRIPTION OF THE PREFERRED EMBODIMENT

Referring now to the figures, in which like numerals indicate like parts, and particularly to FIG. 1, the self-powered device for wearing on the back and for cutting foliage of the present invention is shown generally at 10 for wearing on the back 12 and for cutting foliage 14.

The self-powered device for wearing on the back and for cutting foliage 10 comprises a backpack portion 16 for wearing on the back 12, a foliage cutting portion 18 interchangeably coupled to the backpack portion 16 for cutting the foliage 14, and a coupling portion 20 interchangeably coupling the foliage cutting portion 18 to the backpack portion 16.

Figure 2:
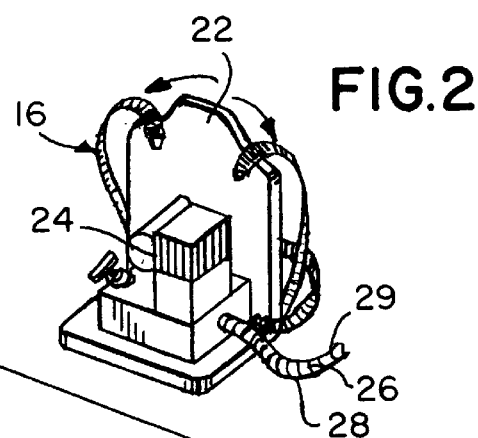
FIG. 2 is an enlarged diagrammatic perspective view of the area generally enclosed by the dotted curves identified by arrow 2 in FIG. 1 of the backpack portion of the present invention.

The configuration of the backpack portion 16 can best be seen in FIG. 2, and as such, will be discussed with reference thereto.

The backpack portion 16 comprises a frame 22 for engaging the back 12, a gas engine 24 attached to the frame 22 of the backpack portion 16, and a flexible shaft 26 operatively connected to the gas engine 24 of the backpack portion 16 for rotation thereby and covered with sheathing 28 and having an end 29.

The foliage cutting portion 18 is typically coined "WEED WACKER," an example of which is disclosed in U.S. Pat. No. 3,708,967 to Geist et al. which is incorporated herein by reference thereto.

The foliage cutting portion 18 of Geist et al. includes a flexible drive shaft [29 of Geist et al.] [28a of the present invention] with an end 30 in a casing [28 of Geist et al.] [31 of the present invention].

Figure 3:
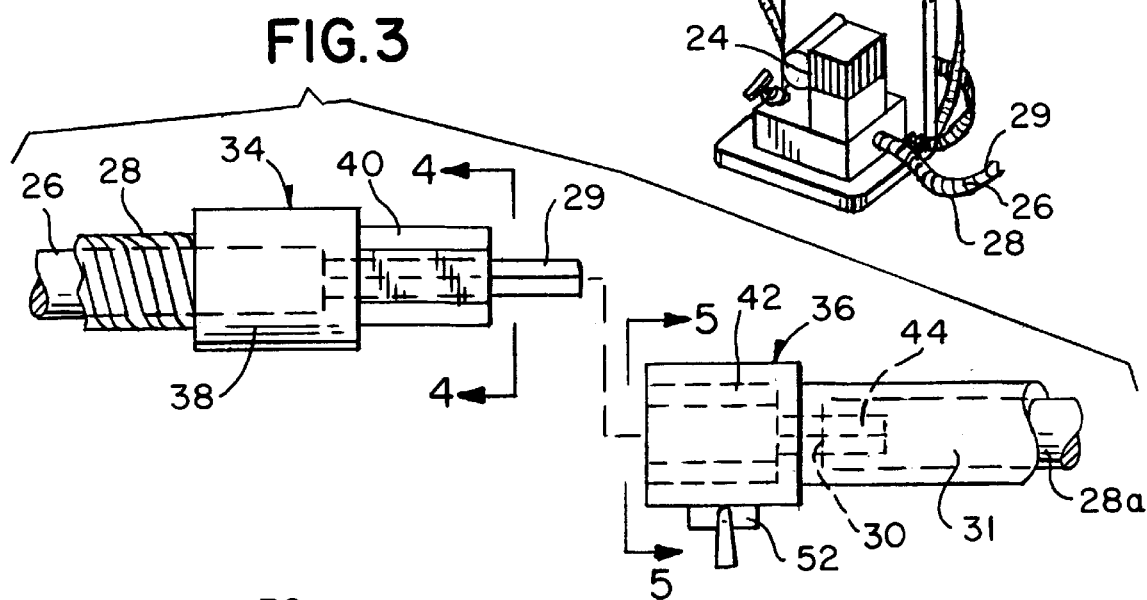
FIG. 3 is an enlarged and exploded diagrammatic side elevational view of the area generally enclosed by the dotted curve identified by arrow 3 in FIG. 1 of the coupling portion of the present invention.
Figure 4:
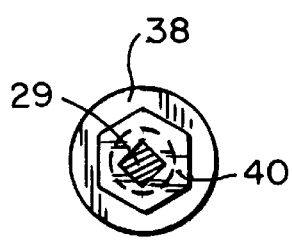
FIG. 4 is a diagrammatic cross sectional view taken on line 4—4 in FIG. 3.
Figure 5:
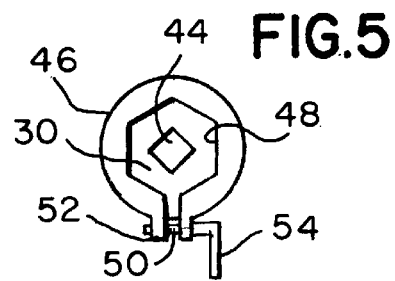
FIG. 5 is a diagrammatic cross sectional view taken on line 5—5 in FIG. 3.

The configuration of the coupling portion 20 can best be seen in FIGS. 3–5, and as such, will be discussed with reference thereto.

The coupling portion 20 comprises a power portion 34 and a tool portion 36 that is interchangeably coupled to the power portion 34 of the coupling portion 20.

The power portion 34 of the coupling portion 20 comprises a collar 38 that is cylindrically-shaped and crimped on the sheathing 28 of the flexible shaft 26 of the backpack portion 16, at the end 29 thereof, and with the end 29 thereof extending rotatably therethrough and being square in lateral cross section.

The power portion 34 of the coupling portion 20 further comprises a stop 40 that is hexagonal in lateral cross section and extends fixedly and axially from the collar 38 of the power portion 34 of the coupling portion 20, with the end 29 of the flexible shaft 26 of the backpack portion 16 extending rotatably therethrough.

The tool portion 36 of the coupling portion 20 comprises a collar 42 that is cylindrically-shaped and crimped on the casing 31 of the flexible drive shaft 28*a* of the foliage cutting portion 18, at the end 30 thereof, and with the end 30 thereof having a blind bore 44 extending axially therethrough which is square in lateral cross section and which fixedly receives the end 29 of the flexible shaft 26 of the backpack portion 16 for rotation therewith.

The collar 42 of the tool portion 36 of the coupling portion 20 has an outer periphery 46 that is cylindrically-shaped and an inner periphery 48 that is hexagonal-shaped and which fixedly receives the stop 40 of the power portion 34 of the coupling portion 20.

The collar 42 of the tool portion 36 of the coupling portion 20 has a split 50 that is defined by a pair of flanges 52 that threadably engage a key 54 that passes therethrough, and when tightened, secures the end 29 of the flexible shaft 26 of the backpack portion 16 in the blind bore 44 in the end 30 of the flexible drive shaft 28*a* of the foliage cutting portion 18, and secures the stop 40 of the power portion 34 of the coupling portion 20 in the inner periphery 48 of the collar 42 of the tool portion 36 of the coupling portion 20.

It will be understood that each of the elements described above, or two or more together, may also find a useful application in other types of constructions differing from the types described above.

While the invention has been illustrated and described as embodied in a self-powered device for wearing on the back and for cutting foliage, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A self-powered device for wearing on the back and for cutting foliage, comprising:
   a) backpack portion for wearing on the back;
   b) a foliage cutting portion interchangeably coupled to said backpack portion for cutting the foliage; and
   c) a coupling portion interchangeably coupling said foliage cutting portion to said backpack portion, wherein said backpack portion comprises:
      i) a frame for engaging the back;
      ii) a gas engine attached to said frame of said backpack portion; and
      iii) a flexible shaft operatively connected to said gas engine of said backpack portion for rotation thereby and covered with sheathing and having an end, wherein said foliage cutting portion includes a flexible drive shaft with an end and a casing in which said flexible drive shaft of said foliage cutting portion is disposed, wherein said coupling portion comprises:
         A) a power portion; and
         B) a tool portion that is interchangeably coupled to said power portion of said coupling portion, wherein said power portion of said coupling portion comprises a collar that is cylindrically-shaped and crimped on said sheathing of said flexible shaft of said backpack portion, at said end thereof, and with said end thereof extending rotatably therethrough and being square in lateral cross section, wherein said power portion of said coupling portion further comprises a stop that is hexagonal in lateral cross section and extends fixedly and axially from said collar of said power portion of said coupling portion, with said end of said flexible shaft of said backpack portion extending rotatably therethrough, wherein said tool portion of said coupling portion comprises a collar that is cylindrically-shaped and crimped on said casing of said flexible drive shaft of said foliage cutting portion, at said end thereof, and with said end thereof having a blind bore extending axially therethrough which is square in lateral cross section and which fixedly receives said end of said flexible shaft of said backpack portion for rotation therewith, wherein said collar of said tool portion of said coupling portion has:
            I) an outer periphery that is cylindrically-shaped; and
            II) an inner periphery that is hexagonal-shaped and which fixedly receives said stop of said power portion of said coupling portion, wherein said collar of said tool portion of said coupling portion further has a split that is defined by a pair of flanges that threadably engage a key that passes therethrough, and when tightened, secures said end of said flexible shaft of said backpack portion in said blind bore in said end of said flexible drive shaft of said foliage cutting portion, and secures said stop of said power portion of said coupling portion in said inner periphery of said collar of said tool portion of said coupling portion.

* * * * *